United States Patent Office 2,867,501
Patented Jan. 6, 1959

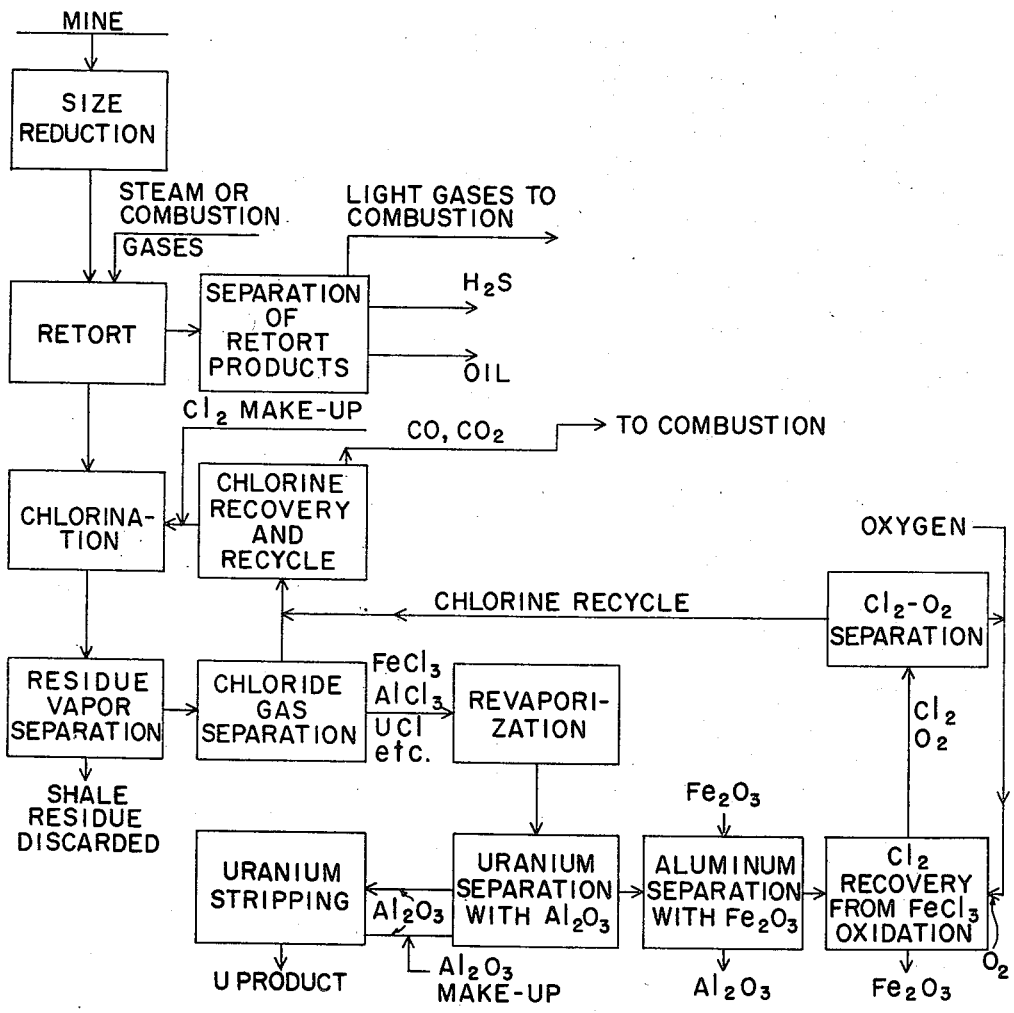

2,867,501

VOLATILE CHLORIDE PROCESS FOR THE RECOVERY OF METAL VALUES

William R. Hanley, Bronx, N. Y., assignor to the United States of America as represented by the United States Atomic Energy Commission Application June 6, 1956, Serial No. 589,839

10 Claims. (Cl. 23—145)

This invention relates to the recovery and separation of metal values from a gaseous stream consisting of volatilized metal chlorides. More particularly this invention relates to a method of separating a desired metal chloride from a volatilized mixture of metal chlorides containing the desired metal values.

In one of its particular aspects this invention is concerned with separating uranium from Chattanooga shale, a mineral occurring in the State of Tennessee and bordering States. Chattanooga shale has an organic fraction; and a metal-bearing fraction comprising about 16% by weight of the total shale. A typical composition of the shale is as follows:

TABLE 1

| Component: | Weight percent |
|---|---|
| $SiO_2$ | 55.4 |
| C (total) | 14.1 |
| $Al_2O_3$ | 9.5 |
| S (total) | 5.1 |
| Fe | 4.3 |
| $K_2O$ | 3.6 |
| $Ca_3$ (as phosphate) | 2.5 |
| MgO | 1.7 |
| H | 1.7 |
| Moisture | 1.0 |
| $TiO_2$ | 0.6 |
| $Na_2O$ | 0.4 |
| Mo | .02 |
| V | .03 |
| Misc | 0.04 |
| U | 0.0065 |

The iron exists in the shale primarily in the form of pyrites.

It has been estimated that Chattanooga shale deposits comprise the largest known uranium reserve in the world. However, the uranium exists in such small quantities (.006 to .008% of the total shale) that it has heretofore been considered impractical to recover the uranium from the shale. The enormity of the problem may be appreciated when it is observed that the tailings from the Colorado Plateau, that is the discard portions, contain about .01 to about .05% uranium. The problem may be more graphically illustrated when it is realized that in order to recover one pound of uranium about 8 tons of Chattanooga shale must be processed, assuming 100% uranium recovery with the uranium present as .006% of the total.

A general object of the present invention is to provide a method for separately recovering metals of the type occurring in Chattanooga shale.

An important object of the present invention is to recover uranium from an ore containing a high ratio of iron and aluminum as compared to the amount of uranium. A principal object of the invention is to provide a method for separating uranium and other metals from a gaseous stream of the chlorides thereof. Another important object of the invention is to provide a method for recovering and separating uranium from Chattanooga shale. Still another object of the invention is to provide a method of recovering and separating uranium from a mixture of ferric, aluminum and uranium chlorides.

With these and other objects in mind, the present invention, broadly stated, is a method for separating a desired metal from a mixture of volatilized metal chlorides containing the desired metal by contacting said mixture with a metal oxide that selectively retains the desired metal chloride on said oxide as its corresponding oxide or oxychloride.

In a somewhat narrower sense, the present invention is a method for separating uranium from a mixture containing iron, aluminum and uranium by chlorinating said mixture under conditions that produce a volatilized mixture of metal chlorides, bringing said volatilized chlorides into contact with granular alumina to quantitatively deposit the uranium on said alumina and thereafter separating the uranium from the alumina.

I have found that a chlorinating agent of the group consisting of carbon tetrachloride, phosgene, chlorine and a mixture of chlorine and sulfur monochloride is effective for the purpose of this invention.

For purposes of discussion and illustration I shall describe the process of my invention in connection with the problem of separating uranium from Chattanooga shale. However, my method is equally applicable in the case where it is desired to separate uranium from other ores containing relatively large quantities of iron and aluminum as compared to the amount of uranium present. This illustration exemplifies the general scope of my invention where it is employed to separate certain other metals of the same type.

The invention will be particularly described with reference to the accompanying flow sheet which illustrates the sequence of steps in recovering uranium from Chattanooga shale.

Referring to the flow sheet, a charge of shale as received from the mine is dry ground, such as by crushers and rod mill, to a particle size in the range —4 to +325 mesh. In most cases, the shale was found to contain .006 to .008% uranium. The ground shale is then retorted in a reactor with steam and/or recycled combustion gases at a temperature of 450 to 800° C. The object of heating the shale is to remove all organic matter volatilizable at the retorting temperature. Gases resulting therefrom such as carbon monoxide and carbon dioxide may be recycled to the reactor to maintain the desired temperature. The retorted shale undergoes a loss of weight ranging from 7% in some cases to as high as 25% of the total weight of the shale charge. The retorted shale at this stage contains as little as 1–13% carbon based on the total weight of the shale.

I have found that the shale may be heated under retorting or roasting conditions in order to remove volatile matter. Retorting may be carried out in a gas combustion retort or steam retort; roasting may be carried out in an apparatus such as a Dorr type "fluo-solids" roaster. In either case, however, the shale should be heated in a manner so as to avoid sintering the shale. I have found that recovery of metal values from the shale is considerably reduced when the shale has been sintered.

The heated shale is then reacted with a chlorinating agent at a temperature in the range 600 to 1000° C. to chlorinate the inorganic portion of the shale. I have found that carbon tetrachloride, phosgene, chlorine and mixtures of chlorine and sulfur chloride are effective reagents for chlorinating the shale. However, since nearly all of the metals present are chlorinated to some degree in the chlorination temperature range recited above, there is an extremely high consumption of the chlorinating agent. Were the chlorinating agent not easily recoverable, it would add markedly to the cost of producing the uranium.

In these circumstances I have found that a mixture of chlorine and sulfur monochloride is the most effective chlorinating agent when the shale has been heated without roasting. For roasted shale any of the chlorinating agents referred to above is satisfactory. Chlorine is particularly advantageous in either case since it may be easily recovered and recycled as will be hereinafter described.

In my experiments, I used a Vycor glass reactor tube charged with 20 to 28 mesh retorted shale. The reactor tube was enclosed by a tubular furnace which provided the desired heating. Dry nitrogen and chlorine was passed through the shale during the chlorination. The products resulting from the chlorination were in the form of a gaseous metal chloride stream and a solid residue. I have found that during the chlorination the residue is reduced to a very fine powder, and a large part of this powder is carried along with the volatilzed chlorides. Separation of the fine solids from the vaporized metal chlorides is effected by passing the solid-gas mixture into a separation zone at temperatures high enough to prevent the deposition of the vaporized chlorides. A temperature of 700 to about 950° C. should be used in this step. A cyclone separator or an electrostatic precipitator is conveniently used to separate the gaseous stream from the finely divided solids.

The optimum chlorination and vaporization conditions were extensively investigated, and it was found that reacting retorted shale with chlorine on a pound for pound basis at temperatures of 600 to 1000° C. resulted in the vaporization of upwards of 85% of the uranium. On the other hand, up to 100% of the iron and up to 90% of the aluminum were volatilized under these conditions. It should be noted that sulfur chlorides are produced in the shale as appreciable amounts of sulfur already exist in the shale in the form of pyrites.

After the volatilized chloride stream has been separated from the solid residue, it is passed to a condensation zone and maintained at a temperature of 100 to 300° C. Here the chloride stream is condensed except for volatile titanium, silicon and sulfur chlorides and most of the excess chlorine. These are removed from the condensation zone. This step is primarily necessary to remove sulfur because it impairs the efficiency of separating the uranium from the volatilized metal chloride stream. Sulfur chlorides and gaseous chlorine are recovered and recycled to the chlorination zone for further chlorination of retorted shale. The condensed metal chlorides are then revaporized by heating to a temperature in the range 600 to 1000° C. The vaporized chlorides are then passed through a bed of granular alumina to deposit uranium on the surface of the alumina. I have found that uranium is quantitatively extracted from the vapor stream under these conditions.

Results of my investigation into the effect of temperature on the extraction of the uranium from the chloride stream are summarized in Table 2 below. Experiments were conducted by sweeping a charge of volatilized shale chlorides through a bed of granular alumina with dry chlorine while maintaining the alumina at exemplary temperatures from 300 to 1000° C. In my experiments I used a low-soda-containing granular alumina characterized by high surface area and good physical strength. The products carried through the bed were collected in a water trap. After each run was finished, the alumina cooled and was then washed with nitric acid to dissolve any metals deposited thereon. The metals dissolved from the alumina bed and the material collected in the water trap were analyzed for uranium and iron.

TABLE 2

*Effect of temperature on deposition of volatilized shale chlorides on alumina*

| Alumina Bed Temp., ° C. | Time, hour | Uranium Bed | Distribution Collector | Fe/U Ratio Bed | Fe/U Ratio Collector |
| --- | --- | --- | --- | --- | --- |
| 300 | 1 | 75.5 | 24.5 | 2,000 | 7,980 |
| 400 | 1 | 84.3 | 15.7 | 1,090 | 17,700 |
| 600 | 1 | 90.1 | | 20.4 | 21,300 |
| 700 | 1 | 96 | 3.8 | 11.5 | 42,000 |
| 800 | 1 | 99 | 1 | 8.7 | 777,000 |
| 900 | 1 | 100 | | | |
| 1,000 | 1 | 100 | | | |

From the results in Table 2, it is clear that at a temperature in the range 600 to 1000° C. the uranium is substantially quantitatively deposited from a volatilized shale chloride stream. The marked increase in the amount of uranium retained in the bed as compared to the amount of iron retained provides graphic evidence of the capacity of the alumina to extract uranium from a vapor of the mixed metal chlorides.

The deposited uranium may be recovered from the alumina by well known techniques. By one method the uranium is converted to a soluble uranium salt by passing an aqueous acid solution (nitric or sulfuric) through the alumina bed to form soluble uranium salts. The uranium salts are separated from the liquid phase by extracting the uranium solution with a selective organic solvent such as benzylamine or diethyl ether. Alternatively, the deposited uranium may be transformed into volatile uranium hexafluoride by passing gaseous fluorine over the alumina at elevated temperatures.

The vapor chloride stream leaving the alumina bed now consists essentially of volatilized iron and aluminum chlorides and trace amounts of other volatile chlorides. In order to separate the iron and aluminum chlorides the chloride stream is then passed through a bed of ferric oxide at a temperature in the range 400 to 700° C. The aluminum chloride is selectively converted to alumina which is separately collected, and ferric oxide is converted to ferric chloride which is vaporized into the chloride stream. The thus formed alumina is of good commercial grade and constitutes a valuable by-product resulting from my process. This alumina can be recycled in my process for use in the step of separating the uranium from the vaporized chloride stream.

The chloride stream passing from the bed of ferric oxide now consists almost entirely of vaporized ferric chloride, chlorine and trace amounts of other metal chlorides. This chloride stream may then be mixed with oxygen and heated to a temperature of about 1000° C. The vaporized iron chlorides are thereby oxidized to produce ferric oxide and chlorine. The ferric oxide thus produced is of good commercial grade and constitutes another important by-product of my process. The chlorine produced is recycled for use in chlorinating the retorted shale.

Normally geologic deposits containing such small quantities of uranium as are found in Chattanooga shale would never be considered as potential sources of uranium. However, in accordance with my invention, it is now possible to recover the uranium from Chattanooga shale economically and in a substantially pure form. The application of my method of separating uranium from Chattanooga shale has a number of other important advantages. For example, large quantities of aluminum and iron oxides in commercially usable forms are also produced in accordance with the method of my invention as applied to Chattanooga shale. Another important advantage is the fact that substantially all of the chlorine can be recovered from the volatilized metal chloride stream and can be continuously recycled for use in the process.

While I have described my invention in connection with the problem of recovering and separating uranium from Chattanooga shale, it will be evident that my method is especially applicable in situations where it is desired to separate uranium from ores containing a high content of aluminum and iron relative to the uranium content.

Upon consideration of the foregoing description, it is evident that the principles of the present invention are of wide application. The method is useful to separate a mixture of metals that form nonvolatile oxides or oxychlorides, such as the metals contained in Chattanooga shale. A vapor of the chlorides of these metals is formed and the vapor is passed through a series of oxide beds to selectively convert the chlorides to their respective oxides or oxychlorides whereby the converted chlorides are selectively retained on the oxide beds.

In accordance with the method of my invention a vapor stream of mixed metal chlorides can be separated into substantially enriched or pure form by selecting the proper oxide reaction.

For example, it is desired to separate the metals of a vapor stream containing the volatile chlorides of molybdenum, titanium, aluminum and vanadium at a temperature of about 500° C. At this temperature all of these metal chlorides are stable in their vapor form. To separate these chlorides into individual metal values the entire chloride stream is passed first through a bed of titanium oxide at about 500° C. The following reaction takes place:

$$MoCl_4 + TiO_2 \rightarrow TiCl_4 + MoO_2$$

Thus the molybdenum chloride is converted to molybdenum oxide and will be deposited on the titanium oxide from which it is selectively leached. The remaining components in the gas stream passing from the titanium oxide bed are passed through a bed of aluminum oxide and the following selective reaction takes place:

$$TiCl_4 + 2Al_2O_3 \rightarrow 2AlCl_3 + TiO_2$$

Titanium is thus converted to its oxide and is deposited on the alumina from which the titanium is selectively leached. There is left a mixture of aluminum and vanadium chlorides in the vapor. These may be separated by employing the following reaction:

$$Al_2Cl_6 + V_2O_3 + Cl_2 \rightarrow 2VCl_4 + Al_2O_3$$

The gas stream now contains only vanadium chloride and it can be condensed to recover the vanadium. The retained metal oxides are separately recovered by dissolving the desired metal in a selective solvent for that metal.

In the above example, when the mixture does not contain titanium, the molybdenum is recovered by passing the vaporized chloride mixture containing molybdenum, aluminum and vanadium through a bed of aluminum oxide and passing the vapor stream from the aluminum oxide through a bed of vanadium oxide.

When the desired metal is vanadium and the purity of the other components is unimportant, the entire gas stream is reacted with vanadium oxide to yield a mixture of the oxides of molybdenum, titanium and aluminum and a volatile stream consisting almost entirely of vanadium chloride. This and similar variations may be employed to selectively separate the desired metal value from the above mixture.

A second example of my invention is the separation of a chloride gas stream containing molybdenum, silicon, titanium, vanadium and iron. The following reactions are employed in separating each of the components of this mixture:

$$MoCl_4 + SiO_2 \rightarrow SiCl_4 + MoO_2$$
$$SiCl_4 + TiO_2 \rightarrow TiCl_4 + SiO_2$$
$$TiCl_4 + VO_2 \rightarrow VCl_4 + TiO_2$$
$$3VCl_4 + 2Fe_2O_3 \rightarrow 4FeCl_3 + 3VO_2$$

If the only desired product were iron then the entire gas stream could be reacted with ferric oxide to yield a mixture of metal oxides and ferric chloride in the vapor phase. Similar variations may be employed depending on the exact nature of the product desired.

For example, a mixture of A and B chlorides can be separated in accordance with the following reaction:

$$ACl + BCl + B\ oxide \rightarrow A\ oxide + 2\ BCl$$

In these reactions, the chlorides must be stable in the vapor phase and the resulting oxide or oxychloride should have a negligible vapor pressure at the temperature at which the reaction takes place, that is the oxide is nonvolatile. The choice of oxide to be used for a given separation process is determined by the relative stability of the oxide and the metal chlorides. The metals are separated in the order of descending reactivity or stability relative to the oxides of the same metals.

Since many embodiments might be made of the present invention and since many changes might be made in the embodiment described, it is to be understood that the foregoing description is to be interpreted as illustrative only and not in a limiting sense.

I claim:

1. The process of separately recovering uranium, iron and aluminum from an ore containing the same which comprises heating said ore with a chlorinating reagent selected from the group consisting of phosghene, carbon tetrachloride, chlorine and a mixture of chlorine and sulfur monochloride to form a volatilized stream of metal chlorides, passing said volatilized chlorides into contact with granular alumina to deposit the uranium on said alumina, recovering the uranium therefrom, passing the remaining volatilized chlorides flowing from said alumina into contact with ferric oxide to selectively convert the aluminum chloride to aluminum oxide, recovering the aluminum therefrom, and thereafter oxidizing the remaining iron chloride in air at a temperature of about 1000° C. to form ferric oxide.

2. A method of separately recovering uranium, aluminum and iron from Chattanooga shale which comprises heating the shale without sintering at a temperature to remove a substantial portion of the organic matter, reacting the heated shale with a chlorinating agent selected from the group consisting of phosgene, carbon tetrachloride, chlorine and a mixture of chlorine and sulfur monochloride to form a volatilized stream of inorganic chlorides, passing said volatilized stream to a condensation zone at a temperature in the range 100 to 300° C. to remove metal chlorides volatile in said condensation zone, and to condense the chlorides of uranium, iron and aluminum, revolatilizing the condensed chlorides at a temperature in the range 600 to 1000° C., passing said revolatilized chlorides into contact with granular alumina to selectively react uranium with said alumina, passing the remaining volatilized chlorides from said alumina into contact with ferric oxide to selectively deposit aluminum on said oxide bed and reacting the chloride stream passing from said oxide bed with oxygen to convert the ferric chloride to ferric oxide and chlorine and recycling the thus formed chlorine.

3. The method according to claim 2 wherein the chlorinating agent is chlorine.

4. The method according to claim 2 wherein the chlorinating agent is a mixture of chlorine and sulfur monochloride.

5. A method of recovering metal values from Chattanooga shale which comprises comminuting said shale, retorting the comminuted shale at a temperature in the range 600 to 1000° C. to remove volatile organic matter, reacting the retorted shale with a chlorinating agent selected from the group consisting of carbon tetrachloride, phosgene, chlorine and a mixture of chlorine and sulfur monochloride to form a stream of volatilized metal chlorides, passing said stream to a condensation zone at a temperature of about 100 to 300° C. to remove condensible chlorides, reheating the condensed chlorine stream to a temperature in the range 600 to 1000° C. to reform a volatilized metal chloride stream and passing said revolatilized chloride stream into contact with granular alumina to selectively deposit uranium on said alumina, passing the chloride stream from said alumina into contact with ferric oxide at a temperature of about 400 to 700° C. to convert the volatilized aluminum chloride to alumina and reacting the resulting chloride stream with oxygen to convert the ferric chloride to ferric oxide and chlorine and recycling the thus formed chlorine.

6. The method according to claim 5 wherein the chlorinating agent is chlorine.

7. A method of recovering uranium from a mixture containing iron and aluminum that comprises passing the mixed volatilized chlorides of iron, aluminum and uranium over alumina to deposit the uranium chlorides selectively on said alumina and recovering the uranium therefrom.

8. A process for separating a mixture containing at least two metals selected from the group consisting of uranium, aluminum, iron, molybdenum, silicon, titanium and vanadium which form stable chlorides in the vapor phase which comprises forming a vapor containing the chlorides of said metals, passing said vapor over a solid oxide of one of said metals that reacts with the chloride of another of said metals to deposit an oxide of the latter to convert at least part of said solid oxide to the corresponding vaporized chloride and thereafter separately recovering at least the first said metal.

9. In a process for separately recovering the metals from a mixture comprising volatile chlorides of molybdenum, titanium, aluminum and vanadium, the steps which comprise forming a vapor of said mixed chlorides, passing said vapor over titanium oxide to convert the molybdenum chloride to molybdenum oxide whereby the molybdenum oxide is deposited on the titanium oxide, passing the vapor from said titanium oxide through aluminum oxide to convert the titanium chloride to titanium oxide whereby the titanium oxide is deposited on the aluminum oxide, passing the vapor from said aluminum oxide through vanadium oxide to convert the aluminum chloride to aluminum oxide and thereafter separately recovering the deposited oxides and the remaining vanadium chloride.

10. A method for separating a mixture containing molybdenum, silicon, titanium, vanadium and iron which comprises forming a vapor of the chlorides of said metals, passing said vapor over silicon oxide to convert the molybdenum chloride to molybdenum oxide whereby the molybdenum oxide is deposited on the silicon oxide, passing the vapor from said silicon oxide through titanium oxide to convert silicon chloride to silicon oxide whereby the silicon oxide is retained on the titanium oxide, passing the vapor from said titanium oxide through vanadium oxide to convert the titanium chloride to titanium oxide whereby the titanium oxide it retained on the vanadium oxide, passing the vapor from said vanadium oxide through ferric oxide to convert the vanadium chloride to vanadium oxide whereby the vanadium oxide is retained on the ferric oxide and thereafter separately recovering the retained oxides.

References Cited in the file of this patent

UNITED STATES PATENTS

| | | |
|---|---|---|
| 1,434,485 | D'Adrian | Nov. 7, 1922 |
| 1,434,486 | D'Adrian | Nov. 7, 1922 |
| 1,646,734 | Marden | Oct. 25, 1927 |

OTHER REFERENCES

Riegel: Industrial Chemistry, 1933, p. 682.